United States Patent [19]

Bitterly

[11] 4,249,083
[45] Feb. 3, 1981

[54] SOLAR ELECTRICAL GENERATOR

[76] Inventor: Jack G. Bitterly, 4723 Vista De Oro Ave., Woodland Hills, Calif. 91364

[21] Appl. No.: 948,677

[22] Filed: Oct. 5, 1978

[51] Int. Cl.³ .............................................. F03G 7/02
[52] U.S. Cl. .................................... 290/1 R; 290/52; 60/641; 60/669
[58] Field of Search ...................... 290/1, 52; 126/432, 126/433, 434; 60/641, 669

[56] References Cited

U.S. PATENT DOCUMENTS

| | | | |
|---|---|---|---|
| 3,613,368 | 10/1971 | Doerner | 60/669 X |
| 4,081,967 | 4/1978 | De Geus | 60/641 |
| 4,089,325 | 5/1978 | Brola | 60/641 X |
| 4,165,614 | 8/1979 | Yeh | 60/669 X |

OTHER PUBLICATIONS

"Solar Program Assessment: Environmental Factors–Solar Thermal Electric" Erda Publication No. 77-47/4, Mar. 1977.

Primary Examiner—J. V. Truhe
Assistant Examiner—W. E. Duncanson, Jr.
Attorney, Agent, or Firm—Poms, Smith, Lande & Rose

[57] ABSTRACT

The engine of the present invention includes a cylindrical, elongated boiler housing with a turbine mounted within it, and the turbine and boiler rotate relative to each other. Heat is applied to the outside of the boiler and converts a liquid working fluid in the boiler to vapor. A shroud in the boiler directs the vapor to the turbine to cause the turbine to rotate in one direction. Because the boiler can rotate, the boiler and shroud rotate about the shaft in a direction opposite the rotation of the turbine. Centrifugal force holds the liquid working fluid against the boiler walls. After passing through the turbine, the working fluid is condensed and it is injected through a hole into the boiler by centrifugal force. The novel condenser which rotates with the boiler housing relies on the centrifugal force developed by rotation. Solar energy, the preferred heat source, is concentrated to a hot line on the boiler. The rotation of the boiler exposes the entire surface to the hot line. The solar collectors are in an array to concentrate the solar energy into two hot lines, one on each side of the boiler. An insulating enclosure around the boiler maintains the heat of the boiler, but windows are provided through the enclosure for allowing the hot lines to pass through.

34 Claims, 16 Drawing Figures

SOLAR ELECTRICAL GENERATOR

BACKGROUND OF THE INVENTION

The present invention relates to a system using solar energy for electrical generation and the engine and other parts of the system.

Since the price of fossil fuels, especially petroleum and natural gas, began to rise, there has been increased demand for solar technology to replace the energy of burning fossil fuel. Most of the applications use the solar energy for heat, primarily space heating or heating water for hot water and swimming pools.

Much of the energy consumed in this country is electrical energy, but technology in harnessing solar energy to produce electricity has lagged behind using solar energy for heat. Solar energy is being used to generate electricity in two fields. The first relates to photovoltaic systems. Presently, the photovoltaic systems are extremely costly, and only in remote, lowpower consumption uses such as satellites or highway warning signs are they cost justified.

The other approach for solar electrical generation uses solar energy to replace the energy of burning fossil fuel or the energy of a nuclear reactor for heating a fluid in a turbogenerator. Solar energy is used to boil water to convert it to steam to drive a turbine which in turn drives a generator. Thereafter, the fluid is condensed and pumped back into the boiler where the cycle continues. This cycle, the Rankine cycle, is typical for power plants.

Although there have been proposals to develop relatively small solar power plants, much of the research has been directed to large solar generators that would replace relatively large coal or other fuel burnings electrical generators, such as the 10 MW generator that is being built in the Mojave Desert near Barstow, California. The project involves a large number of mirrors mounted on the ground which reflect solar energy at a boiler mounted on a tall tower. The boiler operates conventionally and steam is delivered through pipes to a turbogenerator.

There are many drawbacks to the system. First, the boiler is mounted on a tall tower, and there is a substantial heat loss through the long pipes leading from the boiler to the turbine. Sabotage is another concern. One could easily shoot a high powered rifle bullet through a length of exposed tubing, and the high pressure steam would explode through the hole.

There is also another drawback to the large systems. Such systems would either be run by a governmental unit or an electrical utility which means regulated pricing. Smaller systems for use of an industrial facility, a commercial building, a farm or an apartment house or condominiums can eliminate the need of a large regulated utility and of having the government in the power business. This system proposed herein would even be applicable to a single family house, but it is believed that the power from one such system could be shared by a number of houses.

Although the efficiency of a turbogenerator tends to increase as the size increases, small systems eliminate other inefficiencies of large-scale power systems. For example, transformers and overhead and underground wires would be eliminated. Decreased labor costs would also accrue. No billing personnel such as meter readers and billing clerks would be necessary. Even the costs of mailing bills and payments would be eliminated.

If on-site solar electrical generation replaces only a portion of the users electrical needs, price rises by a utility will affect the consumer less.

One of the objects of the present invention is to disclose and provide a small solar electrical generator of a high efficiency so that a single unit could be used by a single electrical user such as an industrial plant, a commercial facility, a farm, a residence or a group of residences.

Efficiency of a Rankine engine increases as the pressure increases and the steam temperature at the turbine increases. Therefore, efficient utilization of solar energy can greatly increase the efficiency of the turbogenerator. However, in traditional tubular or flat plate heat transfer surfaces, heat transfer is extremely inefficient. It may be necessary, therefore, in order to have the same temperature and pressure to use a prohibitively large solar collector. Another object, therefore, of the present invention is to disclose and provide an extremely efficient boiler. Tubular and flat plate boilers also heat unevenly. The portion to which the heat is applied expands more than the rest of the walls of the boiler. This uneven expansion and contraction can weaken the boiler. Even if it does not cause the boiler to fail, the weakening is taken into account in designing boilers, and they must be made thicker. Another object of the present invention is to disclose and provide a boiler that has uniform heating of the boiler walls and that exchanges the heat from the boiler to the working fluid efficiently.

Along with efficient heat transfer within the boiler, it is important that the solar collectors use solar radiation efficiently and transfer the solar energy to the boiler. To do so, it is important that the minimum amount of energy is reflected off the boiler. It is an object of the present invention to minimize energy transfer losses.

Another object of the present invention is to disclose and provide a condenser of increased efficiency for use in the present system.

Another object of the present invention is to disclose and provide a system which eliminates or decreases many of the inefficiencies caused in large-scale power plants. If the turbine is located a great distance from the boiler, there may be a substantial pressure drop due to frictional effects of the pipe if the boiler is far from the turbine. Heat is also transferred through long pipes. A large pump may be needed to pump the water from the condenser to the boiler. Another object of the present invention is to eliminate or substantially decrease inefficiencies in the pump itself.

These and other objects will become evident from the foregoing description.

SUMMARY OF THE INVENTION

Instead of having a separate boiler and a turbine, the turbine is mounted inside the boiler. Whereas in conventional systems the turbine shaft and blades rotate with respect to a stationary boiler, the boiler rotates about the turbine shaft and blades. The generator is attached to the inside of the boiler and also rotates with respect to the turbine shaft to create electrical energy.

The boiler is an elongated cylinder. Solar radiation is focused over the entire length of the boiler in as narrow a strip as possible thus producing a hot line. The rotation of the boiler causes an even heat flux over the walls of the housing as the cylindrical surface rotates under the hot line.

Centrifugal force caused by the rotation of the boiler causes the water or other liquid to create a film on the inside of the boiler wall. The heat causes the water to change the steam, and a shroud directs the steam into the turbine where it causes rotation of the housing. After passing through the housing, the steam flows to a condenser which also works in part because of the centrifugal force on the condensed water.

A single vapor cycle Rankine engine can be replaced by a binary vapor gas cycle. The rotating boiler could also be used as a heat collector for a Sterling engine.

BRIEF DESCRIPTION OF THE DRAWINGS

FIGS. 4, 5, 6 and 7 relate to the solar collector of the present invention.

FIGS. 13 and 14 relate to the Sterling engine embodiment of the present invention.

FIGS. 15 and 16 are graphs relating to the operation of the rotating boiler.

DETAILED DESCRIPTION OF THE PREFERRED EMBODIMENT

Figure 1:
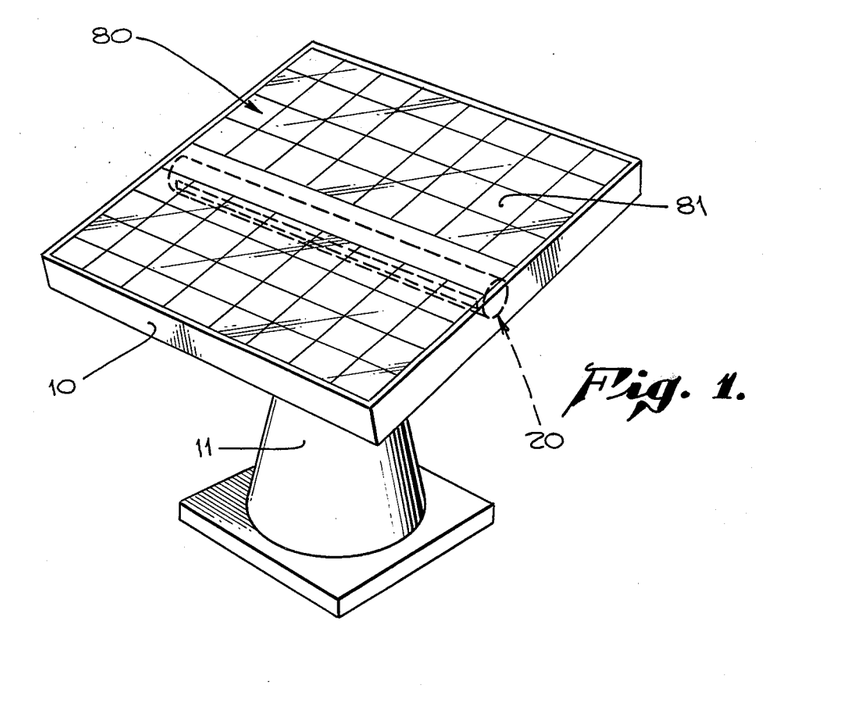
FIG. 1 is a perspective view of the electrical generation system of the present invention. It includes the solar collector array, the base which would include means for changing the angle of the array for maximum energy utilization. The engine is also shown.
Figure 2:
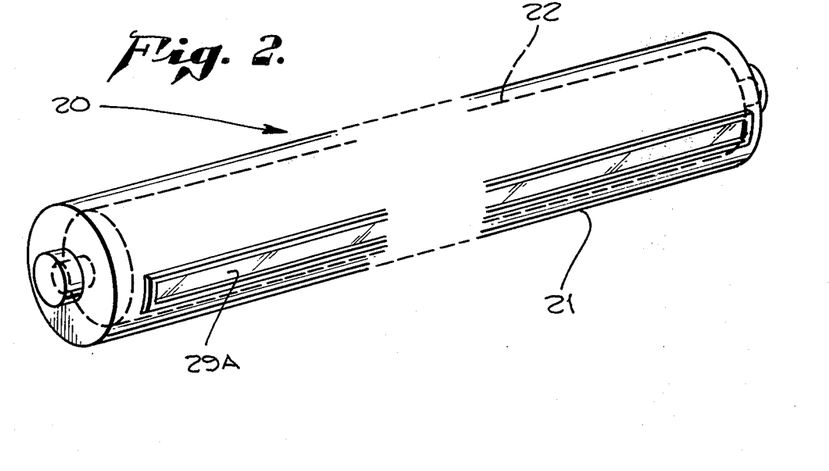
FIG. 2 is a perspective view of the engine showing the enclosure that surrounds the boiler housing. The outline of the boiler is shown in phantom.
Figure 3:
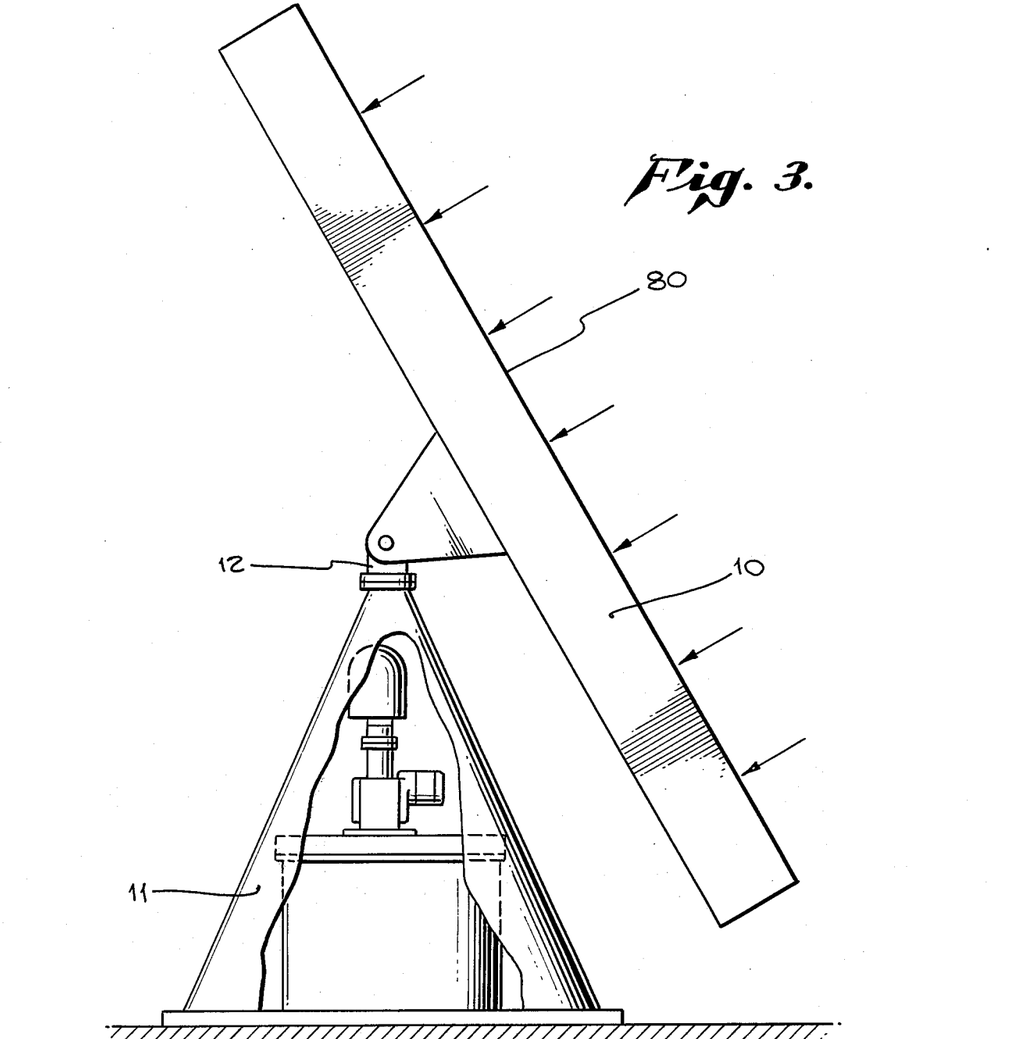
FIG. 3 is a side view of the solar generation system. Mounted in the pedestal and closure is a Sterling engine, generator and eutectic heat storage medium.

The system for electrical generation from solar energy of the present invention comprises an elongated engine 20 (FIG. 1) and an array of solar collectors 80 mounted on each side of engine 20. As shown in FIG. 1 in the exemplary embodiment, both engine 20 and solar array 80 are mounted in a support 10 which is pivotally mounted at 12 on base 11. A tracking heliostat is mounted in either support 10 or base 11 and allows support 10 to pivot about the elevation axis and/or the azimuth axis.

The elongated engine 20 extends approximately the entire length of support 10, and the array of solar collectors is on each side of the engine. The engine includes an elongated boiler and a turbine mounted within the boiler (FIG. 9), and the turbine and the housing rotate relative to each other.

Concentrating means concentrate the solar energy of the array and direct the energy to the housing to heat a working fluid contained in the housing to convert it to gas. The concentrating means are shown in the exemplary embodiment in FIG. 4. A shroud directs the gas into the turbine. In the exemplary embodiment of FIG. 9, shroud 26 directs gas in boiler 22 into turbine 28. Means for mounting the boiler for rotation are provided whereby the gas passing through the turbine causes the boiler to rotate around the turbine.

THE ENGINE

Mounting the turbine within the boiler and allowing the boiler to rotate around the turbine produces surprising results. As explained earlier, the engine uses solar energy for its heat source. The novel solar collector will be explained in more detail hereinafter.

Figure 9:
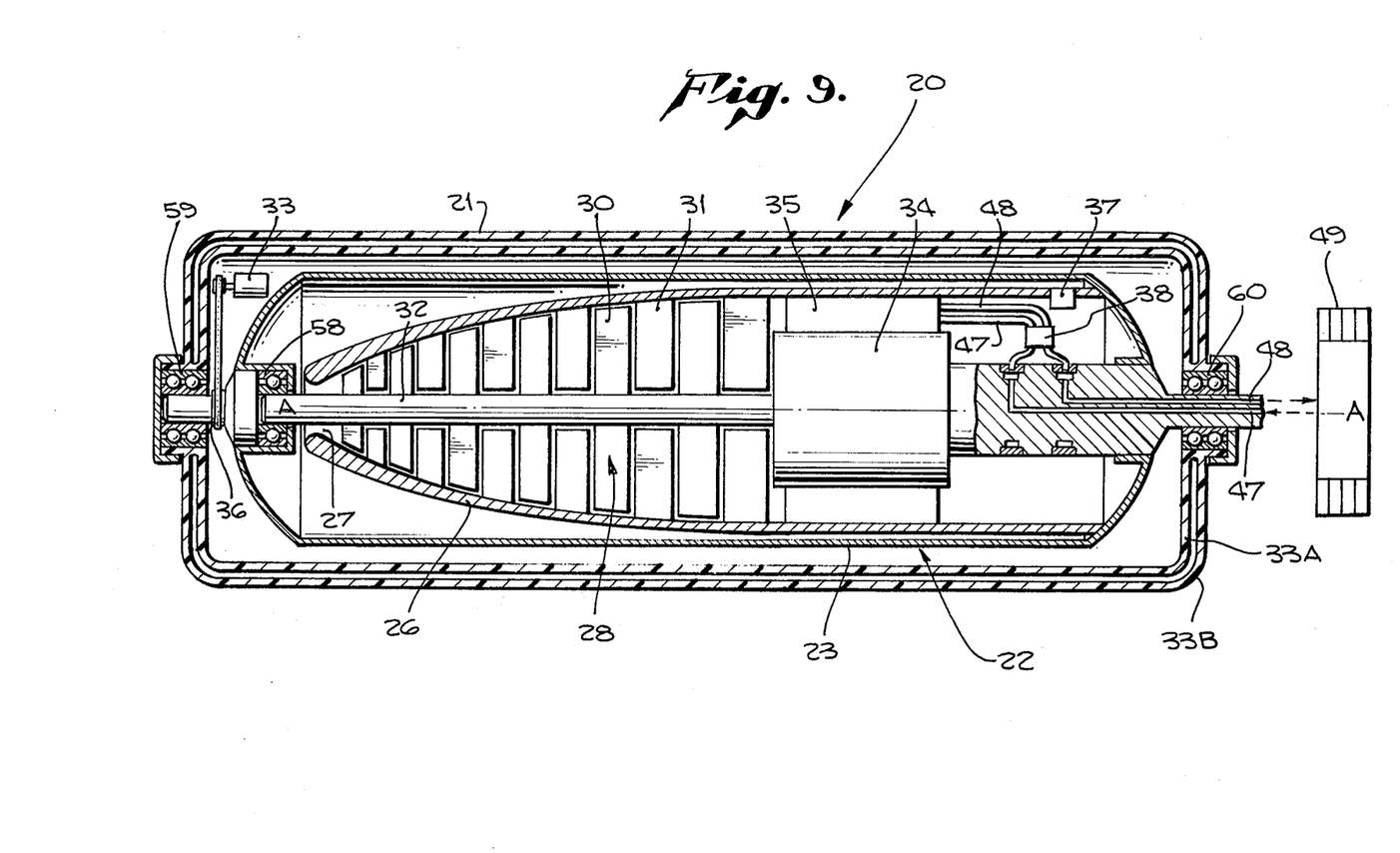
FIG. 9 is a side view of the turbogenerator of the present invention utilizing a single Rankine cycle.

The engine of the present invention may use a number of thermodynamic cycles. The first exemplary cycle utilizes the Rankine gas cycle and is shown in FIG. 9. It should be recognized that the dimensions of the engine and the parts in FIG. 9 are for explanation only. For example, it is anticipated that the ratio of the length of the boiler to the diameter will be approximately 20, but the boiler of FIG. 9 is wider for ease of explanation. Metric equivalents in the foregoing description are approximations or are rounded off.

In the Rankine cycle, a pump directs liquid water to a boiler. The water is next heated in the boiler where it changes phase to steam of high pressure. The steam is then expanded through a turbine where it does work. From the turbine, the saturated vapor is condensed in a condenser from which it is pumped to repeat the cycle. Most Rankine cycle engines use superheated steam in the turbine which increases the cycle's efficiency. As has been previously stated, housing 22, also which functions as the boiler rotates about axis A—A. Boiler 22 contains a small amount (e.g. ½ liter) of pure water. As will be further explained, boiler 22 rotates at an angular velocity in the order of 600 rpm. The length of the boiler is approximately 12 ft (3.7 m) with a diameter no greater than about 7 in (18 cm). Because the boiler rotates, the water creates a film approximately 0.5 in (0.13 cm) thick on the inside of the boiler wall.

As heat impinges on the cylindrical boiler wall, the water is boiled and undergoes a phase change in which it is converted to high pressure steam at about 1000° F. (538° C.), 1000 psi (70.5 Kg/cm$^2$). Shroud 26 directs the steam through opening 27 and into turbine 28. The blades are shown schematically. As the steam is driven through turbine 28 it does work by causing relative rotation between turbine blades 30 and stators 31. The turbine rotates on the order of 10,000 rpm while the boiler counterrotates at about 600 rpm. In conventional turbogenerators, the stators are secured to the ground so that the turbine blades 30 mounted on the shaft or rotor 32 rotate at a high velocity within the shroud 26 and housing 22. In the present invention, however, the housing or boiler is not prevented from rotating. Therefore, it rotates in the opposite direction from the shaft and blades of the turbine, and this rotation of the boiler is important to the proper functioning of the invention.

Boiler 22 is permitted to rotate on bearings 59 and 60 through fixed enclosure 21. Shaft 32 rotates with respect to boiler 22 through bearing 58 and a rotorstator arrangement in generator 34 in which shaft 32 rotates a rotor inside a generator armature of generator 34. The armature of generator 34 is fixed within boiler 22 so it rotates in an opposite direction as shaft 32 and the rotor within generator 34.

Figures 10, 11:
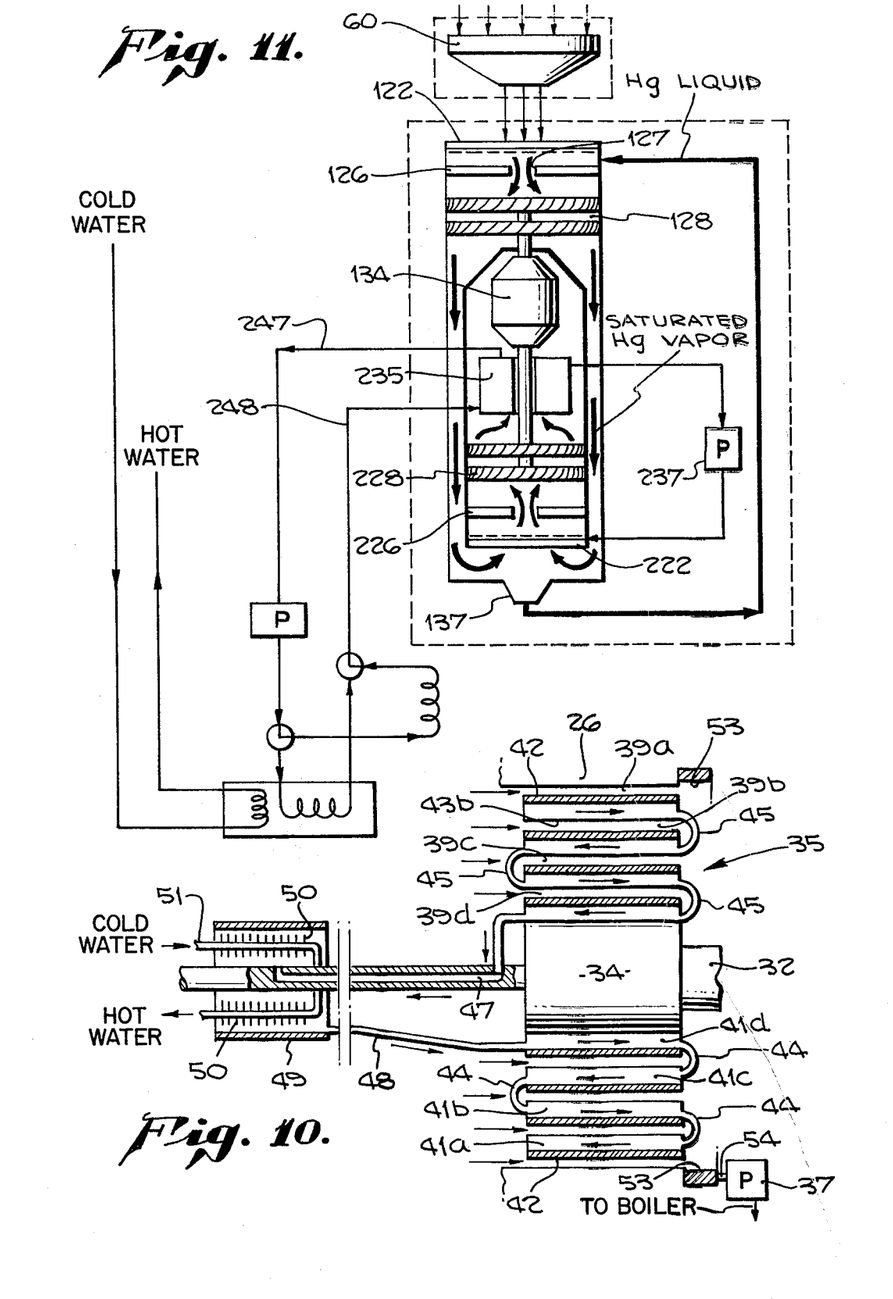
FIG. 10 is a detailed view of the condenser of the present invention.
FIG. 11 is a schematic of the operation of the binary gas turbine cycle.

The expanded low temperature spent steam is condensed to water in a modified heat pipe condenser 35 shown schematically in FIG. 9 and in greater detail in FIG. 10. After being condensed in a manner set forth hereinafter, the condensed water is directed to feedwater pump 37 where it is directed between the housing wall and shroud where it can be boiled and recycled. Pump 37 is mounted through a portion of the shroud for directing the water through the shroud. Pump 37 may be a conventional pump, but it is anticipated that pump 37 could merely comprise an opening through the shroud whereby the rotation of the shroud directs the water by centrifugal force through the pump and the shroud overcoming the steam pressure between the boiler wall 23 and shroud 26.

A start-up motor 33, preferably a DC motor, is provided to begin rotating boiler 22 through pulley-belt arrangement 36. As discussed in more detail below, solar energy strikes boiler wall 23 horizontally in hot lines. If the boiler is not rotating, the fluid inside will pool at the bottom. The motor causes the fluid to film where it can be heated by the solar energy. Also, the high intensity energy on the stationary boiler wall would tend to burn through the relatively thin boiler wall. The rotation prevents this from occurring.

Motor 33 is preferably light controlled. A photoelectric cell may be provided to start the motor rotating the boiler when there is sufficient sunlight to operate the engine. The cell may be associated with the heliostat which aims the solar array at the sun. The amount of power the motor must provide may be decreased as the solar intensity increases. Motor 33 may also be attached to a servo system to act as a governor for use rotating boiler.

THE CONDENSER

Condensing means comprises a plurality of concentric passageways through which the working fluid passes from the turbine. In FIG. 10, a representation of the exemplary embodiment although not drawn to scale, condensing means 35 comprise a plurality of concentric passages 39. Inner concentric passage 39d is surrounded by concentric passages 39c, 39b and 39a. Although four concentric passages are shown, the number may vary depending on the heat transfer sought. In FIG. 10, means are provided for directing the steam to pass through condenser 35 from left to right. Although not shown, there are support members in each passageway 39 to help support the condenser structure. The supports in passage 39a connect the condenser to shroud 26, and both the condenser and the shroud rotate together.

The condensing means also includes a sealed system having a secondary fluid sealed within it. The sealed system includes a plurality of spaced apart annular chambers, and the passageways 39 provide the spacing.

In the exemplary embodiment, chambers 41 are part of the sealed system which holds a secondary fluid, which may be pure water. Conduit means including two sets of conduits connect adjacent annular chambers. Relatively hot steam passing through passageways 39 condense on the relatively cooler outside walls 42 of chambers 41. Because of centrifugal force, water in the chambers tend to create a film of secondary working fluid on the inside of outside wall 42. When the steam condenses on wall 42, it heats the wall and vaporizes the secondary working fluid within each chamber. One of the reasons for using the proposed condenser is because more heat can be exchanged using a phase change than in simple heat exchangers.

As the secondary fluid boils and changes to steam, it is directed toward the axis of the compressor by a second set of conduits 45 which connect each annular chamber for conducting vapor secondary fluid to the innermost annular chamber 41d. From there, the vapor next travels through first portion 47 of tube means to heat transfer chamber 49 where the heat is transferred externally. Cold water is pumped through tube 51 in chamber 49, and the vapor condenses on fins 50 thereby transferring the heat to the water in tube 51. The size of chamber 49, the length of pipe 51 and the length of first portion 47 of the tube means are not to scale.

The water heated in tube 51 can be used in a number of ways. First, it could be used for domestic or industrial hot water directly. Secondly, the hot water could be used to supply heat for a heat exchanger in a hot water tank. The heat could also be expelled into the environment or it could be used for space heating or process heating requirements. In that case, the heat may be directed to a storage medium from which heat could be drawn when the engine was not operating. Providing valving to direct the hot water to perform different functions is within ordinary skill.

It will be noted that heat transfer chamber 49 is rotating with condenser 35. Therefore, pipe 51 also revolves around the axis of rotation. Where pipe 51 enters a stationary source, a rotating seal must be provided. Providing a seal for pipe 51 is better than having a rotating seal in the engine or the condenser because the fluid within the engine is under high pressure whereas the water in pipe 51 is under less pressure. Therefore, there is less likelihood for a leak.

The vapor that is directed into chamber 49 condenses on fins 50 into water that is directed by centrifugal force to the outside of chamber 49. Thereafter, it is directed through second portion 48 of the tube means to the annular chambers 41.

In the exemplary embodiment, the condensate travels through tube 48 into innermost chamber 41d. Centrifugal force causes the condensate to create a film on the outside wall 42 of each chamber 41. A portion of the condensate that enters each chamber is directed by a first set of conduits 44 connecting the outside wall of each progressive annular chamber with the chamber surrounding the first mentioned chamber so that liquid can be conducted to outside annular chambers 41c, 41b and 41a. The first set of conduit means 44 is shown in the lower portion of FIG. 10 to run from the bottom wall of each chamber somewhere into the next chamber. On the other hand, because second set of conduits 45 are conducting vapor from the inside portions of chambers 41 to the inside portion of the chamber immediately inside the first mentioned chamber, the effect of centrifugal force on the vapor is inconsequential.

Means are provided in the condenser for directing the vapor working fluid from the turbine through the passages. As the vapor condenses, centrifugal force throws the condensate against the outside wall of the passage. For example, vapor passing through passage 39b collects on outside wall 43b.

The centrifugal force further directs the condensate from the outside walls of the annular passages to collecting means 53 spaced radially outward from annular passageways 39 where it is directed through tube 54 to the pump 37 for interjection back into the boiler.

Although the walls of the passage and the chambers are shown to be parallel with the axis of rotation, they may be angled slightly so that centrifugal force can direct the condensate along slanted walls. It will also be recognized that even without angling the outside walls of the annular conduits, the flow of steam being directed to the condenser will tend to direct the condensate to the side of the conduits having the collecting means.

The rotating condenser produces at least one surprising result—a pump may not be needed for the secondary fluid although one may be provided as shown at 38 in FIG. 9. The centrifugal force offers little or no resistance to the movement of the vapor secondary fluid which moves from the chambers 41 through the second set of conduits 45 to the first portion of the means 47. When the vapor is condensed in heat transfer chamber or heat sink 49, the centrifugal force directs the secondary fluid, now in the liquid stage along angled tube 48 and through successive chambers 41d, 41c, 41b and 41a. Moreover, the centrifugal force also directs the condensate to collecting means 53.

At almost every heat transfer stage in the condenser there is a change of phase. When the steam enters conduit 39, its phase is changed from steam to water. The secondary fluid in chambers 41 is converted to steam by the heat of condensation. The vapor in chamber 49 is condensed back to water on fins 50. These phase changes greatly increase the amount of heat transferred. If for example the steam temperature at the turbine's final stage is 220° F. (104° C.), then the heat pipe condenser operating at approximately 200° F. (93° C.) will absorb approximately 978 Btu/lb (543 cal/gm) at little or no increase in temperature. On the other hand, a standard fluid heat exchanger must carry almost two orders of magnitude greater amounts of fluid because its heat capacity is only about 1 Btu/lb° F. (1 cal/cm° C.).

Although the single gas Rankine engine is uncomplicated, it is not as efficient as other engine cycles. One example of a more efficient engine cycle is the binary vapor cycle, and the system of the present invention can be modified to utilize the cycle. Such modification is shown in schematic in FIG. 11 and in actuality in FIG. 12. Elements similar to those in the Rankine embodiment are preceded by a "1." The binary vapor cycle engine also includes a secondary housing. Reference numerals for its parts are preceded by "2."

Figure 12:
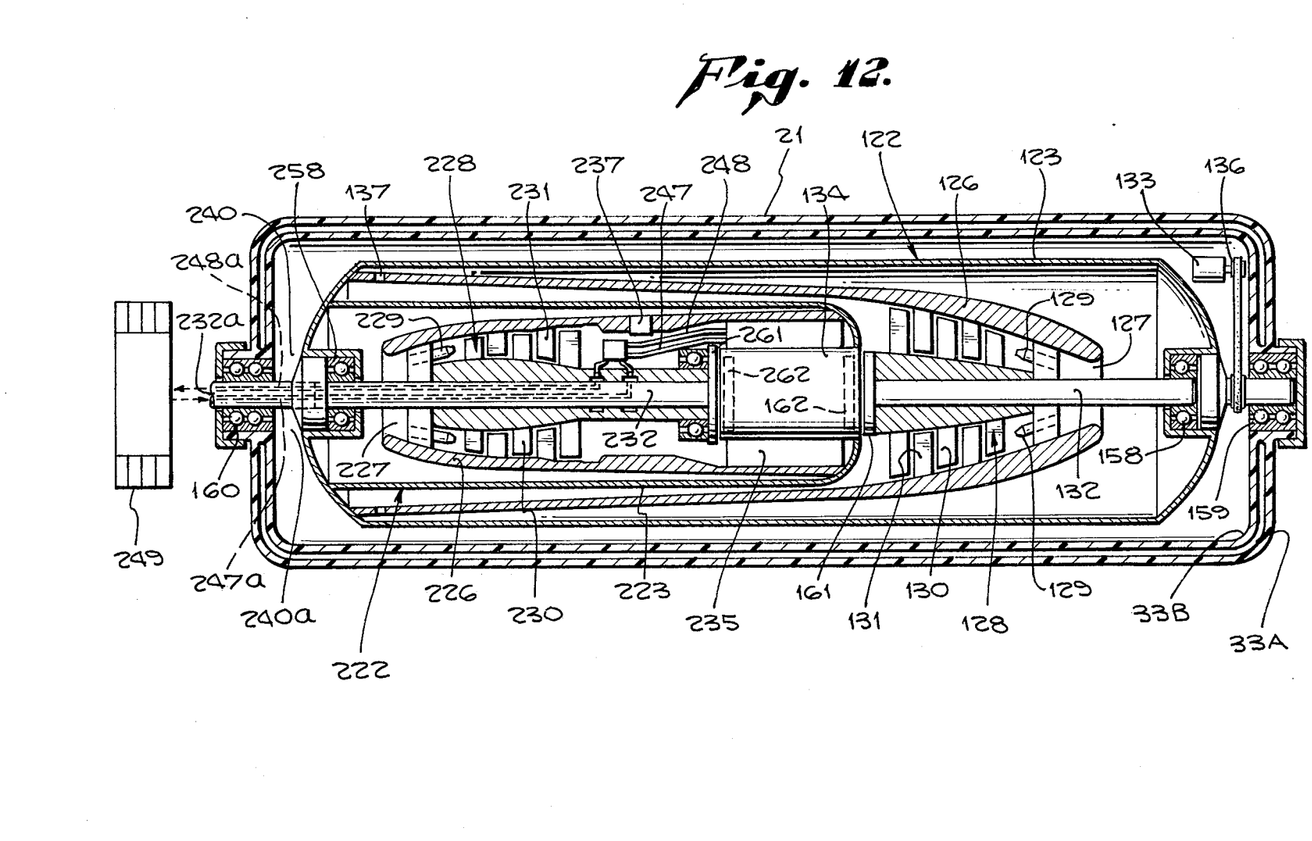
FIG. 12 is a side sectional view of the turbogenerator of the present invention utilizing the binary gas cycle.

Secondary housing means are on the downstream end of the turbine for receiving the working fluid from the turbine and for condensing the working fluid thereon, the secondary housing being heated thereby. There is a secondary turbine in the housing, and there is a secondary working fluid contained within the secondary housing for being heated thereby and converted to gas. A secondary shroud directs the vaporized secondary working fluid to the secondary turbine whereby the turbine rotates as a result of the vaporized secondary fluid passing through it.

In FIG. 12, the operation of the turbine in boiler 122 is similar to the operation of the turbine in boiler 22 in FIG. 9. Boiler 122 is rotating, and a thin film of the primary working fluid is heated and converted to gas. The Rankine engine of FIG. 9 utilizes water or other fluid having a similar temperature and pressure drive, but mercury or other similar characteristic fluid is the fluid contained within boiler 122. The mercury gas is directed by shroud 126 through opening 127 into turbine 128. Although they were not shown in association with FIG. 9, nozzles 129 may be used to increase the velocity of the gas. As a result of the mercury gas passing through the turbine, shaft 132 and blades 130 rotate relative to stator 131, shroud 126 and boiler 122. These latter elements are free to rotate.

The spent mercury gas is directed to the outside wall 223 of secondary boiler or housing 222 where it condenses. Because of the centrifugal force caused by rotation, the condensed mercury liquid is directed back into boiler 122 through feedwater pump 137, which is shown to be one or more openings in shroud 126. The centrifugal force overcomes the pressure of the mercury gas between boiler wall 123 and shroud 126.

Because the mercury gas condenses on wall 223, the wall heats sufficiently to boil the secondary fluid contained within secondary boiler 222. In this case, the secondary fluid is water. The boiling creates steam which is directed by shroud 226 into opening 227, through nozzles 229 and against turbine blades 230 causing rotation of the shaft 232 and blades 230 relavtive to the shroud 226 and the stators 231. The spent steam is then directed to condenser 235 which operates similarly to condenser 35 directing heat contained in the vapor through second conduit 248 to external heat exchanger 249. The condensed water is then reinjected into boiler 222 by feedwater pump 237. If the pressure caused by centrifugal force at feedwater pump 237 or 137 is insufficient to overcome the pressure between the boiler wall and the shroud, a conventional pump may be substituted for the mere opening.

It will be noted that the secondary housing 222 rotates with primary housing 122. It is best to allow turbines 128 and 228 to operate at their own natural speeds. Therefore, there is no single shaft between the two housings.

In order for both turbines to contribute to power generation, there must be means for relative rotation between them. In FIG. 9, there is only a necessity that relative rotation between the turbine shaft 32 and boiler 22 be provided. In FIG. 12, boiler 122 rotates on bearings 159, 160 in enclosure 21. The relative rotation is permitted by bearings 158, 258. Shaft 132 is permitted to rotate relative to boiler 122 by bearing 158, and shaft 232 is permitted to rotate relative to boiler 222 and boiler 122 by bearing 258.

Means must be provided so that the rotation of both shafts relative to the generator can produce electricity. This is accomplished by having first transmission means for driving a first portion of the generator through the relative rotation of the shaft and the boiler and a second transmission means for driving a second portion of the generator through the relative rotation of the secondary boiler and the shaft of the secondary turbine. The first transmission means comprises a magnet 161 on shaft 132 which drives the rotor of the generator through a magnet 162, and the second transmission means includes magnet 261 on shaft 232 of the secondary turbine which drives magnet 262 to drive the secondary rotor of the generator.

In the discussion of FIG. 9, it was stated that a low pressure seal was provided for pipe 51. The device could be modified with a high pressure seal if the rotary condenser is not employed. Such a high pressure seal is shown in FIG. 12 wherein shaft 232 rotates about an internal shaft 232a. Tubes 247, 248 empty into chambers 240, 240a which surround internal shaft 232a. Fluid in chambers 240, 240a is directed to tubes 247a, 248a to the condenser. O-rings (not shown) would be provided to prevent leakage.

Although not shown, electricity generated by generator 34 or 134 is directed through appropriate conductors such as slip rings through shaft 32 (FIG. 9) or 232 (FIG. 12) through any well known rotary conductor to the appropriate electric wiring to be used.

A single external condenser could also be used in conjunction with a number of the present engines. This arrangement allows for a standard engine size, and if the user requires more power than one engine can produce, he can have more than one engine. Because condensers of different sizes are stock items, a single condenser for all engines may be more convenient and less expensive.

THE SOLAR COLLECTOR

Solar energy can be collected and concentrated in a number of different ways. In order to have high efficiency engine operation, the highest practical operating temperatures are mandatory. First, the solar collector must concentrate solar heat on the entire length of boiler or housing 22. It is also advantageous to direct the solar energy perpendicular to the cylindrical boiler surface. Solar energy ideally will be focused in as narrow a strip as possible. This strip produces a hot line on the boiler surface. A single, cylindrical, parabolic reflector with the boiler 22 at the focus (such a collector is known as the Winston parabolic collector) may be used, but these collectors tend to be bulky. Therefore, the collector of the present system was devised to overcome the bulkiness and to concentrate the solar energy in a hot line. Because the system images solar radiation, tracking of the sun will be necessary to compensate seasonal changes in the sun's angle as well as the sun's change in position during the day.

It has been estimated that the average yearly solar flux over the United States is 1400 Btu/ft$^2$.day (380 cal/cm$^2$.day). In some areas of the United States, the solar flux, which varies with latitude and weather conditions, is substantially below the national average. For example, areas on the Pacific coast of Washington have a yearly average solar flux as low as 269 cal/cm$^2$.day whereas the average solar flux at the Barstow, California solar power plant is 569 cal/cm$^2$.day. Perhaps a more meaningful solar flux would be that falling on Los Angeles, an area with a high population density. It has been estimated that the average solar flux is approximately 447 cal/cm$^2$.day (1649 Btu/ft$^2$.day), almost 18 percent higher than the national average. Many areas of the Southwest, the Rockies and the Deep South have a solar flux almost as high or greater than that in Los Angeles.

The amount of the solar flux is important in calculating the amount of power that the engine of the present invention will produce based on the engine efficiency as well as the estimated efficiency of the solar collector.

The solar collecting means of the present invention comprises an array of collector sections on both sides of engine 20. The array extends substantially the entire length of the housing and extends in directions away from the housing to include a sufficient number of collector sections to give sufficient heat to the housing. In the exemplary embodiment, the array 80 of solar panels 81 extends eight panels in length along the axis of engine 20 and four panels in width on either side of the engine. Each panel is approximately 1.5 ft × 1.5 ft (0.46 m × 0.46 m), and the array extends 12 ft (3.7 m) in a direction along the length of the engine 20 and 6 ft (1.8 m) in each direction away from the engine.

Figure 4:
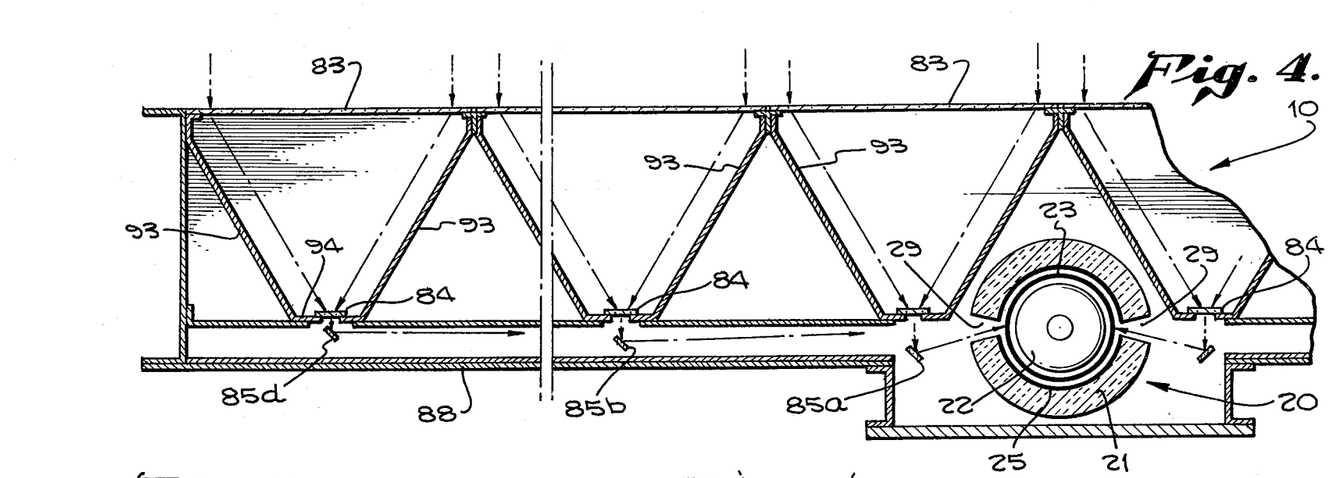
FIG. 4 is a front view of substantially one side of the solar panel.

Each array has converging means for converging the solar rays to a collimating means extending parallel to the boiler housing. The collimating means directs the converging rays into parallel paths where it is reflected to the boiler. As was discussed briefly above, the solar collector should direct the sun's rays to form a hot line on the housing. The generally parallel rays of the sun fall on lenses 82 (FIG. 4). In the exemplary embodiment, lenses 83 are linear Fresnel lenses each with a relative aperture of approximately f/0.8. It must be noted that Fresnel lenses 83 converge the light along a line extending parallel to the axis of the engine rather than converging the light to a point.

The focused rays from Fresnel lenses 83 are directed to collimating lenses 84 where they are directed to plane mirror 85 which aims the parallel rays at the boiler housing 22. As an alternative, the collimating means and the reflecting means may be combined in a single hyperbolic convex mirror. This would avoid losses due to reflections from the divering lens, but fabrication problems are anticipated.

All optical elements may be plastic instead of glass to minimize weight. Optical quality is not crucial.

The reflecting means of each collector section are mounted out of the path of the rays reflecting from arrays successively farther from the housing. In the exemplary embodiment, specifically FIG. 4, mirror 85a is mounted lower than mirror 85b, and both are mounted lower than mirror 85d. Therefore, none of the mirrors closer to the engine interfere with the light path from mirrors farther from the engine. In the exemplary embodiment, the mirrors are mounted progressively higher as the distance from the engine increases because each mirror 85 is mounted on a support extending below the mirror. The support includes a bracket 87 which is attached to bottom wall 88 of the solar collector. A portion 89 of bracket 87 extends upward to support the mirror, but the mirror is free to pivot on portion 89. A flange 90 extends rearward from the mirror, and an adjustment screw 91 extends through flange 90 and bracket 87 to adjust the distance between flange 90 and bracket 87 to adjust the angle of mirror 85.

Figure 5:
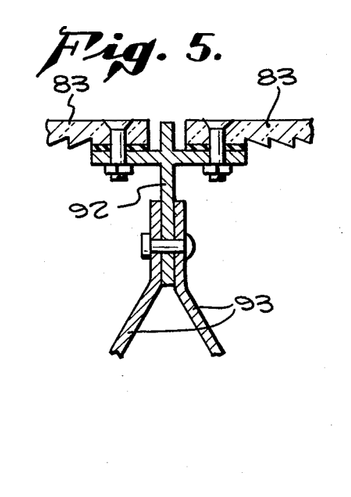
FIG. 5 is a detailed view showing the support for the Fresnel lenses.

Fresnel lenses 83 are mounted on T-shaped bracket 92 which is supported by angled brackets 93. The bottom of angled brackets 93 are bent at 94 to provide a support for collimating lens 84. Angled brackets 93 lend strength to the support 10 for the solar array.

In the exemplary embodiment, there are four lenses extending to the left (FIG. 4) of the engine, four more arrays extend to the right. Therefore, two hot lines are focused on opposite sides of the boiler.

One of the advantages of the system is that it is relatively flat, but it produces a high concentration of radiation. If L is the total width of the system (taken in a direction radially from the engine), and if w is the width of the focused line, the concentration will be L/w. The minimum value of w for each optical unit depends on the distance of the Fresnel lens from boiler 22. It is estimated through preliminary calculations that w will be less than 0.5 in (1.3 cm). If L is 12 ft (3.66 m), the concentration will be approximately 288. Such a concentration is theoretically capable of producing a temperature of more than 1300° F. (704° C.). Losses in the collector primarily result in reflections from the four surfaces of the two lenses 83, 84. The transmittance of Fresnel lens 83 is between 80 and 85 percent, and the transmittance of collimating lens 84 may be as high as 92 percent, and mirror 85 may reflect approximately 95 percent of its incident light. The total transmittance can therefore be as high as $0.85 \times 0.92 \times 0.95 = 0.74$.

Figure 15:
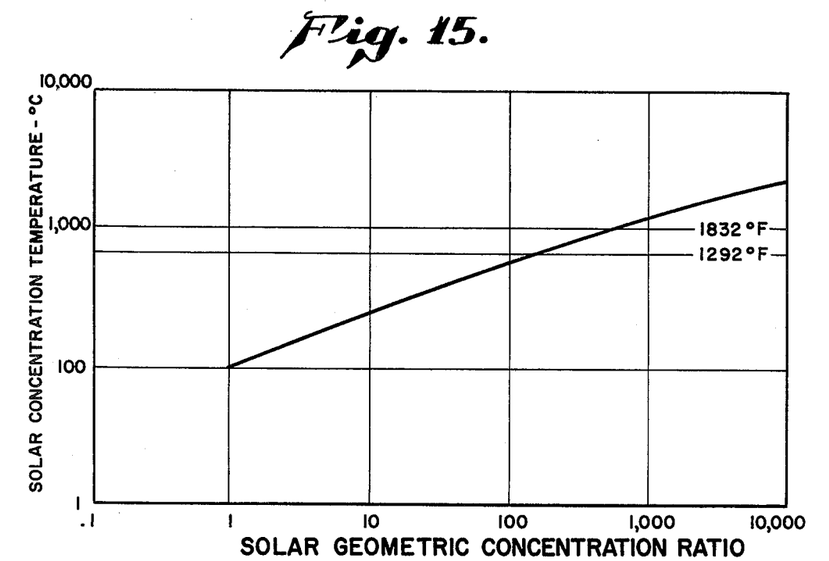
FIG. 15 compares the solar geometric concentration ratio to the theoretical concentration temperature.

FIG. 15 shows graphically what concentration ratio is needed to sustain such temperatures. Both the Geometric Concentration Ratio and the Concentration Temperature are on log scales. It can be seen that a concentration ratio of 150 yields a theoretical concentration temperature of about 700° C. (1292° F.), and a concentration ratio of about 540 yields a theoretical concentration temperature of about 1000° C. (1832° F.). Of course, efficiencies must be accounted for. Thus, if the concentration ratio is 288 with a 12 ft (3.66 m) panel and a 0.5 in (1.3 cm) slit, and the transmittance is 74 percent, then the actual concentration ratio will be $288 \times 0.74 = 213$. Referring to FIG. 15, a 213 concentration ratio will sustain a concentration temperature of about 800° C. (1472° F.).

Figures 6, 7:
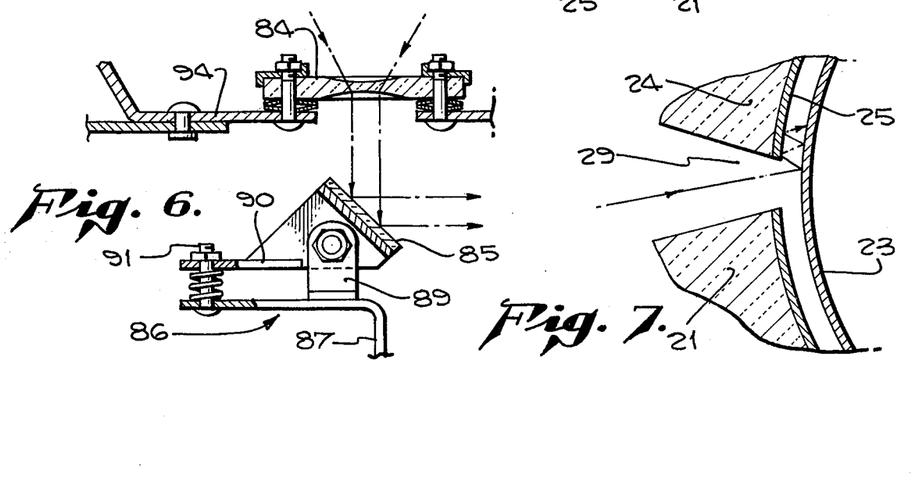
FIG. 6 shows the collimating lens and the reflector which directs the concentrated solar energy to the boiler housing.
FIG. 7 shows how the light rays enter a window through the enclosure and impinge on the housing and how stray rays are reflected back onto the housing.
Figure 8:
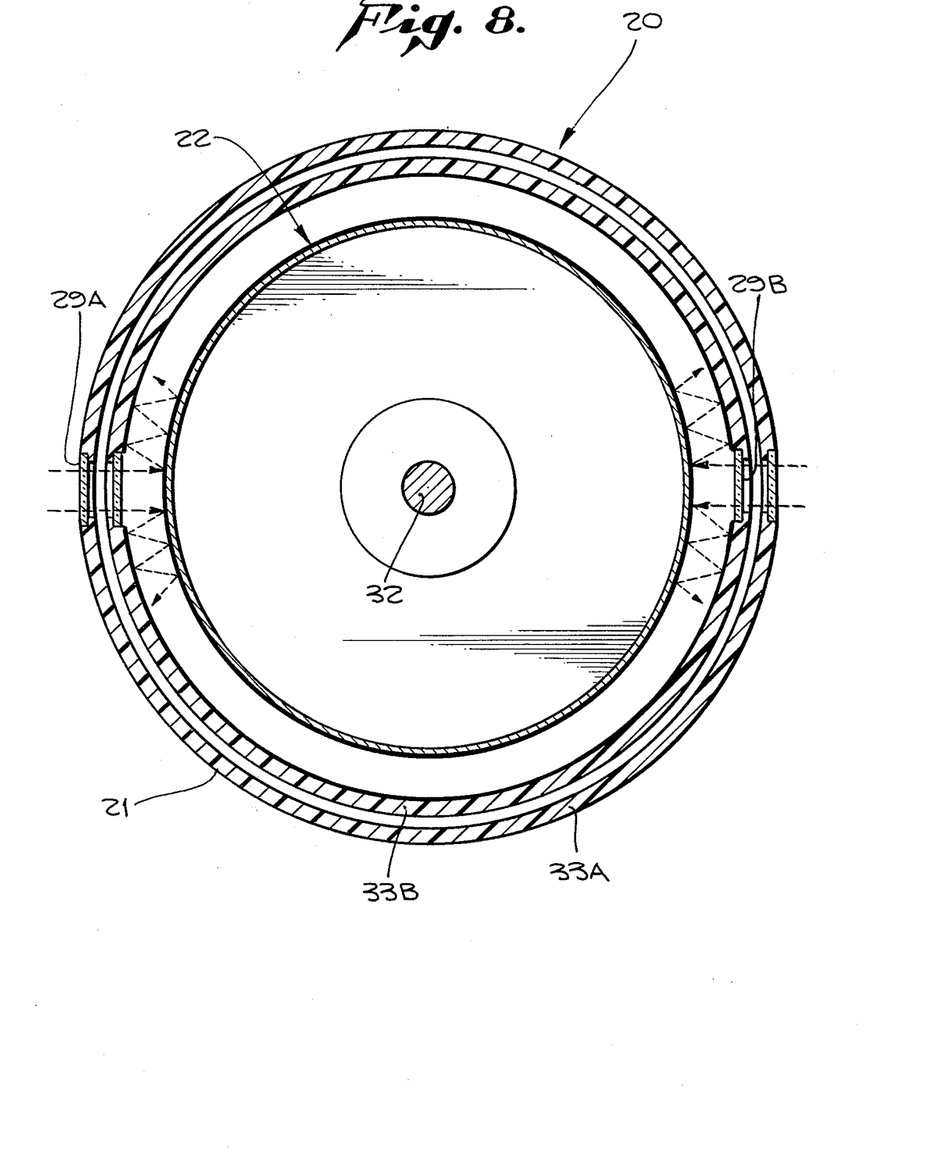
FIG. 8 shows an alternate embodiment wherein the enclosure comprises two glass cylinders or other material containers with slit windows transparent to solar energy and with the space between them evacuated. The inner glass enclosure is silvered to reflect light back onto the housing. There are windows through each glass cylinder.

An enclosure surrounds the boiler housing for insulating the housing. The enclosure has a window therethrough on both sides of the enclosure for passing solar energy to the boiler housing. The reflecting means 85 aim the rays through the window. In the exemplary embodiment of FIG. 4, enclosure 21 is formed of insulating material 24 with an inside reflecting surface 25. As shown in FIG. 7, the ray from mirror 85a passes through window 29 where it strikes boiler wall 23. The majority of the energy is absorbed by the boiler wall but a portion is reflected. Such reflected energy is rereflected from surface 25 back onto wall 23. This provides for efficient utilization of the solar energy. Moreover, the enclosure tends to hold the heat of the boiler wall 23. Alternatively, enclosure 22 may comprise two glass enclosures 33A and 33B separated by a vacuum (FIGS. 9 and 12). The inside of each glass would be silvered, and for the window, the silver over a portion of the glass would be removed. Alternatively, special lenses 29A, 29B could be mounted in glass enclosures 33A, 33B to act as windows, as shown in FIG. 8.

STERLING ENGINE CYCLE

The present invention has many concepts which make it possible to adopt it to a Sterling cycle engine. Such an engine has the theoretical possibility of approaching the ideal efficiency of the Carnot cycle. Sterling engines have become a subject of much recent interest because small engines of high efficiencies have been built. There is a tendency for Rankine cycle engines to lose efficiency as their size is reduced (below 5 MW, they are very inefficient), but Sterling engines as small as 3 KW are known to preserve their efficiency. A Sterling engine also has high reliability and long life as well as extremely quiet operation. In the present invention, the system that includes the Sterling engine includes the rotating boiler of the present invention.

Figure 14:
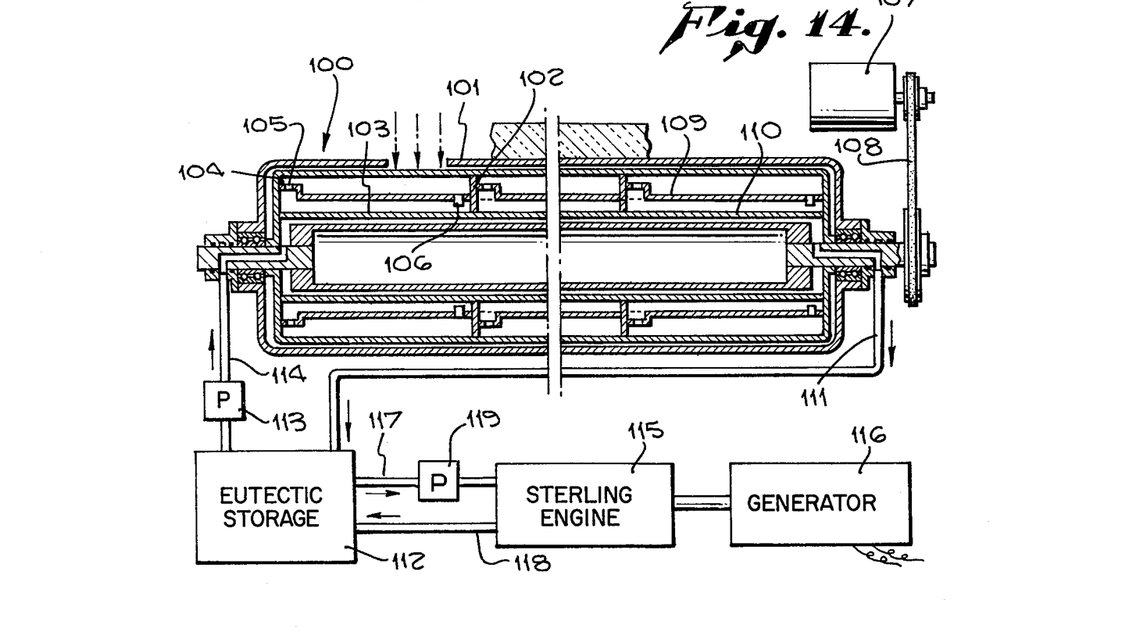
FIG. 14 shows the rotating boiler in detail.

The concentrated sunlight passes through windows in enclosure 100 (FIG. 14) to strike wall 101 of the boiler. Contained within this portion of the boiler is mercury or some other fluid of similar characteristics, used because of its high boiling temperature and relatively low pressure. The heat of the boiler wall vaporizes the mercury on the inside of boiler wall 101, and the vapor passes through nozzle 106 where it contacts condensing surface 103. There are a number of mercury boiler systems within the entire boiler 100 of the present invention, and each is separated by a partition 102. After the mercury vapor passes through nozzle 106 in barrier wall 104, it condenses on condensing surface 103 where the condensate gives up its latent heat of condensation. The heat produced transfers through condensing surface 103 to heat a high temperature fluid (water) in chamber 110. The condensed mercury collects at liquid injector capillary point 105 mounted on injector support 104. The pressure of the mercury behind injector support 104 is magnified by the centrifugal force which overcomes the pressure of the vapor being produced by boiler wall 101. It is believed that placing the barrier wall 109 close to condensing surface 103 increases the heat transfer of condensation. The high temperature fluid in chamber 110 vaporizes and passes through pipe 111 to eutectic storage 112 where through a heat exchanger, it heats the storage medium while condensing. The condensate is pumped by pump 113 through pipe 114 back to chamber 110. As the heat is needed to drive the Sterling engine, the heat is exchanged through pipe 119, and the heat transfer medium is pumped back to eutectic storage through pipe 118. A generator 116 creates electricity from the energy of the Sterling engine 115.

Figure 13:
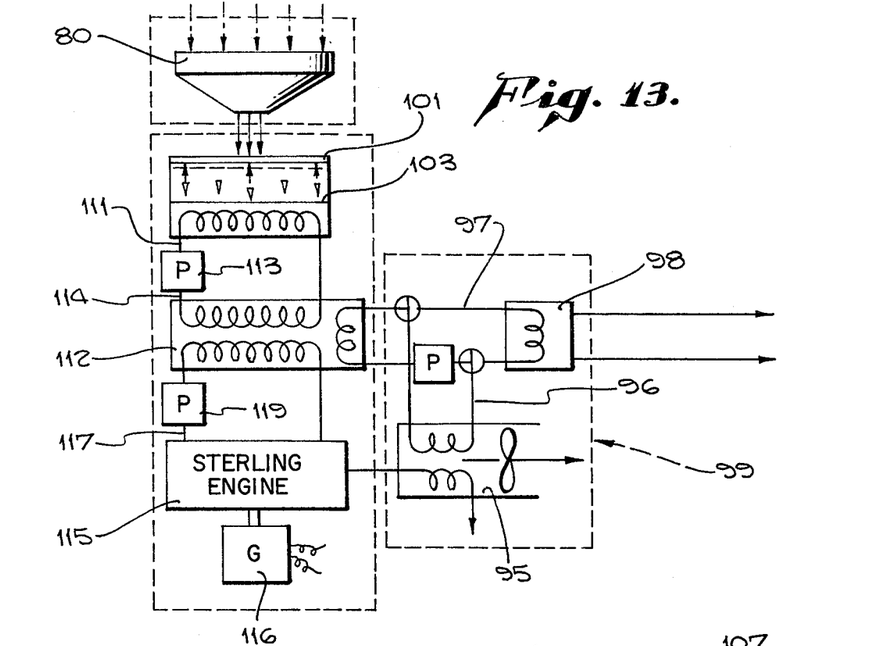
FIG. 13 is a schematic view.

Extra heat held in eutectic storage can be used for various user needs shown at 99 in FIG. 13. For example, through a heat exchanger loop 97, the heat in eutectic storage could be used to heat hot water at 98. Alternatively, some of the heat could be directed through heat exchanging loop 96 to space heater 95. Moreover, the waste heat from Sterling engine 115 could also be used for space heat or it could be exhausted if the heat is not needed.

Because of the efficient heat transfer characteristics exhibited by the rotating boiler, a plurality could be used for supplying steam to a single external turbine or for supplying heat to eutectic storage for a single Sterling engine for large scale power generation.

ROTATING BOILER HEAT TRANSFER

It is most important that the boiler utilize the concentrated solar heat with minimum reflective and convective losses. The boiler must also not impede the flow of energy to the working fluid. High losses on any thermodynamic cycle would drastically reduce overall efficiency sufficiently that the system would not be cost effective.

The overall heat transfer from solar contact to working fluid can be expressed as:

$$1/U = 1/(A_b \cdot h_b) + 1/(A_b \cdot k/t) \tag{1}$$

where
$U$ = overall heat transfer coefficient
$A_b$ = boiler area
$h_b$ = boiling heat transfer coefficient
$k$ = boiler wall thermal conductivity coefficient
$t$ = boiler wall thickness To minimize boiler area and weight and increase conductivity, the boiler wall thickness t should be minimized. But safety factors also govern boiler wall thickness. Safety factor on a boiler primarily relates to the variations in hot spots that can cause degradation of the tensile strength of the wall material.

Standard boilers utilize a small portion of the surface for conducting heat but rotary boilers integrate the heat and produce generally uniform temperature distributions over their surfaces. The wall thickness can be smaller without compromising safety. No other configuration can match the rotary boiler for minimum wall thickness.

Equation (1) may be rewritten to solve for $A_b$:

$$A_b = U/h_b + (U \cdot t)/k \quad (2)$$

$A_b$ therefore varies with approximate linearity with $h_b$ for very thin rotating boilers if it is assumed that k and t remain constant. If $h_b$ is significantly increased, the system size would decrease proportionally.

It has been found that $$N_u = 0.14(G_r P_r)^{\frac{1}{3}} \quad (3)$$

where 0.14 and the exponent $\frac{1}{3}$ are determined by experiment.

Also $N_u$ = Nusselt Number = $(h_b \cdot L)/k$ $G_r$ = Grashof Number = $(L^3 \rho^2 g)/\mu^2 \, (\beta \Delta t)$ $P_r$ = Prandtl Number = $(C_p \cdot \mu)/k$ and
L = linear boiler dimension
$\rho$ = fluid density
$\beta$ = coefficient of expansion
$\mu$ = viscosity
$C_p$ = specific heat coefficient
$\Delta t$ = temperature difference in the boiling film
g = acceleration due to gravity or centrifugal force If the boiler rotates at fairly high values, then earth gravity becomes insignificant and rotational gravity becomes dominant. Next, solving equation (3) for $h_b$ shows that $h_b = K g^{\frac{1}{3}}$ where K is a constant from all the other terms assuming that L, $\rho$, $\beta$, $\Delta t$ and $\mu$ remain constant. In reality the exponent $\frac{1}{3}$ varies from 0.3 to 0.6 depending on the boiler surface condition. $g = v^2/r$ where v = the velocity of the boiler and r = the radius of the boiler. Therefore, increasing the speed of rotation of the boiler increases the heat transfer because g increases.

Figure 16:
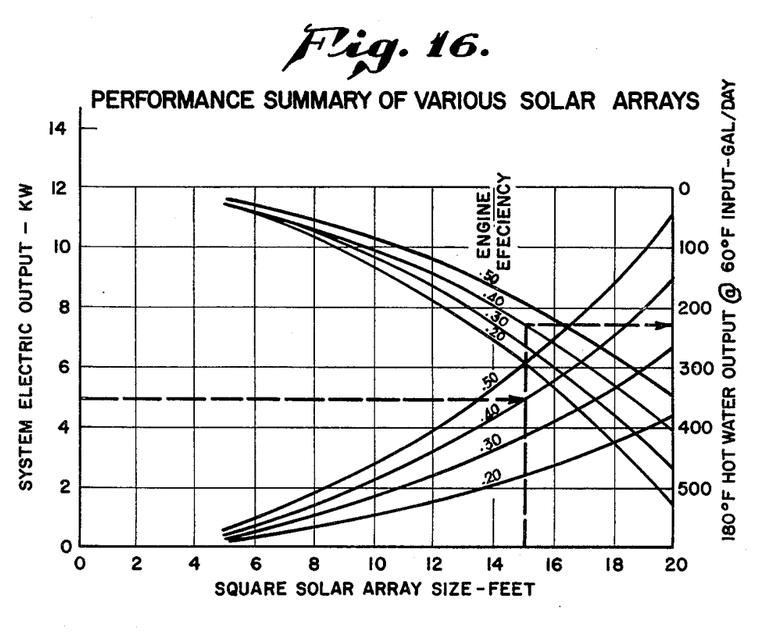
FIG. 16 shows the theoretical electrical and hot water outputs for different efficiency engines and different array sizes.

It should also be mentioned that the heat buildup in the system caused by inefficiencies can be utilized for space heating, water heating, process heat or other application to which such heat can be directed. FIG. 16 shows both the electrical output and the hot water output plotted with respect to different sized arrays with plots for different efficiencies. It assumes a 77 percent efficiency in the array and a 93 percent efficiency in the generator. For example, if we assume a 15 ft (4.6 m) and a 40 percent engine efficiency, a 5 KW output is theoretically possible and approximately 250 gal/day (946 1/day) of 180° F. (82° C.) hot water (assuming a 60° F. (15.5° C.)) input will be produced.

The concepts of the present invention will have many other applications. Although the exemplary embodiment utilizes these concepts, it is not intended to be a limitation on the invention.

I claim:

1. In an engine comprising a turbine and a boiler, the boiler having at least one boiler wall, heating means for heating the boiler for converting a liquid working fluid in the boiler to gas, the improvement comprising:
mounting means for mounting the turbine within the boiler such that the boiler and the turbine rotate relative to each other and shroud means in the housing for directing the gas to the turbine, and condensing means downstream of the turbine for cooling the working fluid and converting it back to liquid and pump means downstream of the condensing means for interjecting the working fluid between the shroud and the wall of the boiler.

2. In the engine of claim 1, the improvement further comprising having the pump means being mounted through a portion of the shroud for directing the liquid working fluid through the shroud.

3. In the engine of claim 1, the condensing means comprising a sealed system having a secondary fluid sealed within it, the sealed system having a plurality of spaced-apart concentric annular chambers, conduit means connecting adjacent annular chambers, a plurality of annular passageways, one between each annular chamber, means for directing the vapor of the working fluid through the annular passageways whereby the working fluid condenses on the annular chambers causing the secondary fluid to vaporize, a heat sink, tube means in the sealed system having a first portion for directing the vapor of the secondary fluid to the heat sink where it condenses and a second portion for directing the condensate to the annular chambers, collecting means for collecting the condensate of the working fluid and for directing it to the pump means.

4. In the engine of claim 3, the improvement further comprising, means between the condensing means and the housing for causing the cooling means to rotate about the axis about which the chambers are concentric, the collector means being spaced radially outward from the annular passageways and at the downstream end of the annular passageways whereby centrifugal force from the rotation of the condensing means directs the condensate of the working fluid to the collector means.

5. In the engine of claim 4, the improvement further comprising the provision of the heat sink being mounted at the axis of the condensing means, the second portion of the tube means angling away from the axis from the heat sink to the innermost concentric chamber whereby centrifugal force drives the liquid working fluid through the second portion of the tube means.

6. In the engine of claim 5, the improvement further comprising the provision of the conduit means having two sets of conduits, the first set connecting the outside wall of each progressive annular chamber with the chamber surrounding the first mentioned chamber for conducting the liquid secondary fluid to outside annular chambers and the second set of conduits connecting each annular chamber for conducting vapor secondary fluid to the innermost annular chamber to the first portion of the tube means.

7. In the engine of claim 1, the improvement comprising
secondary housing means on the downstream end of the turbine for receiving the working fluid from the turbine, for condensing the working fluid thereon, and for holding a secondary working fluid therewithin, the secondary housing being heated by the condensation, a secondary turbine in the secondary housing, the secondary working fluid within the secondary housing being heated and vaporized by the heated secondary housing, a secondary shroud for directing the vaporized secondary working fluid to the secondary turbine whereby the secondary turbine rotates as a result of vaporized secondary fluid passing through it.

8. In the engine of claim 7, the improvement comprising the secondary housing being fixed to the boiler.

9. In the engine of claim 8, the improvement comprising the turbine having a shaft, the shroud being fixed to the boiler and the shroud and boiler rotating about the shaft of the turbine.

10. In the engine of claim 9, the improvement comprising the secondary turbine having a shaft, and means between the shaft of the secondary turbine and the secondary housing for permitting rotation of the shaft of the secondary turbine relative to the secondary housing.

11. In the engine of claim 9, the improvement comprising a generator in the secondary housing, first transmission means for driving a first portion of the generator through the relative rotation of the shaft and the boiler, a second transmission means for driving a second portion of the generator through the relative rotation of the secondary housing and the shaft of the secondary turbine.

12. In the engine of claim 11, the improvement comprising the provision of the first and second transmission means comprising a magnet on the shaft and the shaft of the secondary turbine respectively and a magnet on the first and second portions of the generator respectively whereby the generator is driven by magnetic connections.

13. In the engine of claim 7, the improvement further comprising the heating means comprising solar collector means and concentrating means for concentrating the solar radiant energy into substantially a plane to fall at least one line on the boiler.

14. In an engine comprising a turbine and a boiler, the boiler having at least one boiler wall, heating means for heating the boiler for converting a liquid working fluid in the boiler to gas, the improvement comprising:
mounting means for mounting the turbine within the boiler such that the boiler and the turbine rotate relative to each other and shroud means in the housing for directing the gas to the turbine, the improvement further comprising the turbine having a shaft, the shroud being fixed to the boiler and the shroud and boiler rotating about the shaft of the turbine, and pump means being mounted through a portion of the shroud for directing the liquid working fluid through the shroud.

15. In the engine of claim 14, the pump means comprising an opening through the shroud whereby the rotation of the shroud directs the liquid working fluid by centrifugal force through the pump means.

16. In an engine comprising a turbine and a boiler, the boiler having an elongated, generally cylindrical boiler wall, heating means for heating the boiler for converting a liquid working fluid in the boiler to gas, the improvement comprising:
mounting means for mounting the turbine within the boiler such that the boiler and the turbine rotate relative to each other and shroud means in the housing for directing the gas to the turbine, the heating means comprising means for directing heat energy to the entire length of the boiler wall over at least a portion of the circumference.

17. In the engine of claim 16, the improvement further comprising the heating means comprising solar collector means and concentrating means for concentrating the solar radiant energy into substantially a plane to fall along at least one line on the boiler wall.

18. In the engine of claim 17, the improvement further comprising an enclosure around the boiler for insulating the boiler, the enclosure having at least one window therethrough for passing the concentrated solar energy to the boiler wall.

19. In the engine of claim 18, the enclosure comprising means for reflecting reflected solar energy from the boiler wall back onto the boiler wall.

20. In the engine of claim 17, the solar collecting means comprising an array of collector sections on both sides of the boiler, the array extending substantially the entire length of the boiler and extending in directions away from the boiler to include a sufficient number of collector sections to give sufficient heat to the boiler.

21. In the engine of claim 20, the improvement in the solar collector further comprising, each collector section having a converging means for converging the solar rays to a collimating means extending parallel to the housing, the collimating means directing the converged rays into parallel paths, and reflecting means for directing the parallel rays from the collimating means to the boiler.

22. In the engine of claim 21, the improvement in the solar collector further comprising mounting means for mounting the reflecting means of each collector section out of the path of the rays reflected from the collector sections successively farther from the boiler.

23. In the engine of claim 21, the improvement further comprising an enclosure around the boiler for insulating the boiler, the enclosure having a window therethrough on both sides of the enclosure for passing solar energy therethrough to the boiler wall, means on the reflecting means for aiming the rays from the collimating means at the window on the side of the enclosure of the respective array.

24. In the engine of claim 16, the improvement further comprising to provision of the heating means comprising a solar collector, means on the solar collector for directing the solar energy along at least one plane to the boiler through the axis of rotation of the boiler.

25. In a boiler having a housing for containing working fluid therein, the boiler having an elongated, generally cylindrical boiler wall for transferring heat energy from a source to inside of the boiler to heat the working fluid to convert it from a liquid to a gas, the improvement comprising:
rotation means for rotating the boiler to present different portions of the boiler wall to the heat source, the boiler containing a relatively small amount of working fluid, the rotation means rotating the boiler at at least a velocity sufficient to cause the working fluid to form a thin film by centrifugal force on the inside of the boiler wall.

26. In the boiler of claim 25, the improvement further comprising the provision of the rotation means including a turbine mounted within the boiler whereby the turbine rotates due to the pressure of the gaseous working fluid passing through the turbine to rotate the turbine and boiler relative to each other, and an electrical generator within the boiler operatively connected to the turbine for generating electricity upon rotation of the turbine, whereby the turbine, shroud means and generator are maintained in the boiler under hermetic seal.

27. In the boiler of claim 25, the improvement further comprising a barrier plate inside of the housing having a nozzle therethrough, a condenser plate inside of the barrier plate, nozzle means for directing the gaseous working fluid through the barrier plate to the condensing plate, and chamber means beneath the condensing plate for holding a second liquid working fluid, whereby the heat of condensation by the working fluid which passes through the nozzle to the condensing plate causes the secondary working fluid to heat, and heat transfer means for utilizing the heat of the secondary fluid.

28. A condenser for condensing saturated vapor to liquid, the condenser comprising a sealed system having a secondary fluid sealed within it, the sealed system having a plurality of spaced-apart concentric annular chambers, conduit means connecting adjacent annular chambers, a plurality of annular passageways, one between each annular chamber, means for directing the saturated vapor through the annular passageways whereby the saturated vapor condenses on the annular chambers causing the secondary fluid to vaporize, a heat sink, tube means in the sealed system having a first portion for directing the vapor of the secondary fluid to the heat sink where it condenses and a second portion for directing the condensate to the annular chambers, collecting means for collecting the condensate of the saturated vapor, and means for rotating the condensing means whereby the condensate and liquid secondary fluid are forced to the outside surfaces of the passageways and annular chambers respectively but the saturated vapor and vapor secondary fluid are not moved by centrifugal force so that the centrifugal force directs the liquid through the condenser to their desired location.

29. The condenser of claim 28 wherein the collector means are spaced radially outward from the annular passageways and at the downstream end of the annular passageways whereby centrifugal force from the rotation of the condensing means directs the condensate of the saturated vapor to the collector means.

30. The condenser of claim 28 wherein the conduit means has two sets of conduits, the first set connecting the outside wall of each progressive annular chamber with the chamber surrounding the first mentioned chamber for conducting the liquid secondary fluid to outside annular chambers, and the second set of conduits connecting each annular chamber for conducting vapor secondary fluid to the innermost annular chamber, means connecting the innermost annular chamber to a heat sink whereby the vapor secondary fluid is condensed and second means for connecting the heat sink with the chambers for directing the condensed secondary fluid back to the chambers.

31. A solar collector comprising an array of collector sections on at least one side of an object to be heated, the array extending substantially the entire length of the object and a distance radially outward from the object, each array having converging means for converging the solar rays along a line substantially parallel to the object, collimating means at the line extending parallel to the object for directing the converged rays into parallel paths and reflecting means for directing the parallel rays from the collimating means to the object.

32. The solar collector of claim 31 wherein the array has collector sections extending away from the object and mounting means for mounting the reflecting means of each collector section out of the path of the rays reflected from the collector sections successively farther from the housing.

33. The collector of claim 32 wherein the reflector means aim the collimated rays to a hot line on the object.

34. A system for electrical generation from solar energy comprising:
(a) an elongated engine;
(b) an array of solar collectors on each side of the engine;
(c) the engine including an elongated boiler and a turbine mounted within the boiler, the turbine and the boiler rotating relative to each other;
(d) concentrating means for concentrating the solar energy of the array and directing the energy to the boiler to heat a working fluid contained in the housing to convert it to gas;
(e) shroud means for directing the gas into the turbine; and
(f) means for mounting the boiler for rotation whereby the gas passing through the turbine causes the boiler to rotate around the turbine.

* * * * *